US012762471B2

(12) United States Patent
Hertzberg et al.

(10) Patent No.: US 12,762,471 B2
(45) Date of Patent: Oct. 13, 2026

(54) MACHINE LEARNING TECHNIQUES FOR PREDICTING CLASSIFICATION PROGRESSION

(71) Applicant: UnitedHealth Group Incorporated, Minnetonka, MN (US)

(72) Inventors: Jeffrey Hertzberg, Minneapolis, MN (US); Neal Kelly, St Louis Park, MN (US); Miguel Martinez, Katy, TX (US); Emily Kilgore, Eden Prairie, MN (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 827 days.

(21) Appl. No.: 17/987,141

(22) Filed: Nov. 15, 2022

(65) Prior Publication Data

US 2024/0160997 A1 May 16, 2024

(51) Int. Cl.

*G06N 20/00* (2019.01)
*G06F 18/214* (2023.01)
*G06F 18/22* (2023.01)

(52) U.S. Cl.

CPC ........... *G06N 20/00* (2019.01); *G06F 18/214* (2023.01); *G06F 18/22* (2023.01)

(58) Field of Classification Search

CPC ........ G06N 20/00; G06F 18/22; G06F 18/214
See application file for complete search history.

(56) References Cited

U.S. PATENT DOCUMENTS

| | | | | |
|---|---|---|---|---|
| 11,311,230 | B2 | 4/2022 | Sullivan et al. | |
| 2008/0263559 | A1* | 10/2008 | Das | G06F 9/5083 718/104 |
| 2014/0364334 | A1 | 12/2014 | Muraca | |
| 2015/0164452 | A1 | 6/2015 | Choi et al. | |
| 2020/0005931 | A1* | 1/2020 | Madabhushi | A61N 5/1039 |
| 2020/0321117 | A1 | 10/2020 | Kartoun et al. | |
| 2020/0353250 | A1 | 11/2020 | Haddad et al. | |

(Continued)

FOREIGN PATENT DOCUMENTS

WO 2021/046074 A1 3/2021

OTHER PUBLICATIONS

Grueso, Sergio, and Raquel Viejo-Sobera. "Machine learning methods for predicting progression from mild cognitive impairment to Alzheimer's disease dementia: a systematic review." Alzheimer's research & therapy 13, No. 1 (2021): 162. (Year: 2021).*

(Continued)

*Primary Examiner* — Casey R. Garner
(74) *Attorney, Agent, or Firm* — Alston & Bird LLP

(57) ABSTRACT

Various embodiments of the present disclosure provide methods, apparatus, systems, computing devices, computing entities, and/or the like for predicting progression of condition classifications using a progression prediction machine learning model. The progression prediction machine learning model is trained using training data that assigns an outcome label to each entity that is in a defined base cohort based at least in part on whether the entity has subsequent severity level that exceeds an initial severity level. Once trained the progression prediction machine learning mode is configured to predict a severity level escalation probability in a future time period for an entity.

20 Claims, 6 Drawing Sheets

(56) References Cited

U.S. PATENT DOCUMENTS

| | | | | |
|---|---|---|---|---|
| 2022/0277830 | A1* | 9/2022 | Neumann | G16H 50/80 |
| 2023/0020908 | A1* | 1/2023 | Drake | G16H 10/60 |

OTHER PUBLICATIONS

"Classes and Stages of Heart Failure," American Hearth Association, Jan. 2023, (article), (3 pages), available online: https://www.heart.org/en/health-topics/heart-failure/what-is-heart-failure/classes-of-heart-failure.

Benjamin, Emelia J. et al. "Heart Disease and Stroke Statistics—2019 Update: A Report From the American Heart Association," Circulation, vol. 139, No. 10, Mar. 5, 2019, pp. e56-e528, DOI: 10.1161/CIR.0000000000000659.

Fahmy, Ahmed S. et al. "Machine Learning for Predicting Heart Failure Progression in Hypertrophic Cardiomyopathy," Frontiers In Cardiovascular Medicine, vol. 8:647857, May 13, 2021, pp. 1-9, DOI: 10.3389/fcvm.2021.647857.

Figueroa, Jose F. et al. "Concentration of Potentially Preventable Spending Among High-Cost Medicare Subpopulations," Annals of Internal Medicine, vol. 167, No. 10, Oct. 17, 2017, (12 pages), DOI: 10.7326/M17-0767.

Gonnella, Joseph S. et al. "Disease Staging Clinical and Coded Criteria," Thomson Medstat, vol. 21:99, (Year: 2003), (902 pages), Ann Arbor, MI, available online: https://www.hcup-us.ahrq.gov/db/nation/nis/DiseaseStagingV5_26ClinicalandCodedCriteria.pdf.

Konstam, Marvin A. "Heart Failure Costs, Minority Populations, and Outcomes: Targeting Health Status, Not Utilization, To Bend The Cost-Effectiveness Curve," Journal of the American College of Cardiology, JACC: Heart Failure, vol. 6, No. 5, May 2018, pp. 398-400, DOI: 10.1016/j.chf.2018.02.005.

Lu, Xing Han et al. "Recurrent Disease Progression Networks for Modelling Risk Trajectory of Heart Failure," PLOS One, vol. 16, No. 1:e0245177, Jan. 6, 2021, pp. 1-15, DOI: 10.1371/journal.pone.0245177.

Puyalnithi, Thendral et al. "Prediction of Transition Sequence of Diseases Severity Levels Using Clinical Datasets With Data Mining Approaches," Biomedical Research, vol. 28, Issue 15, Dec. 3, 2017, pp. 6900-6906, ISSN 0970-938X.

Sun, Xu et al. "Feature-Frequency-Adaptive On-Line Training For Fast and Accurate natural Language Processing," Association for Computational Linguistics, vol. 40, No. 3, pp. 563-586, Sep. 1, 2014, DOI: 10.1162/COLL_a_00193.

Tripoliti, Evanthia E. et al. "Heart Failure: Diagnosis, Severity Estimation and Prediction of Adverse Events Through Machine Learning Techniques," Computational and Structural Biotechnology Journal, vol. 15, (2017), pp. 26-47, DOI: 10.1016/j.csbj.2016.11.001.

Urbich, Michael et al. "A Systematic Review of Medical Costs Associated with Heart Failure in the USA (2014-2020)," PharmacoEconomics, vol. 38, pp. 1219-1236, Aug. 19, 2020, DOI: 10.1007/s40273-020-00952-0.

* cited by examiner

MACHINE LEARNING TECHNIQUES FOR PREDICTING CLASSIFICATION PROGRESSION

BACKGROUND

Various embodiments of the present disclosure address technical challenges related to performing predictive data analysis and provide solutions to address the efficiency and reliability shortcomings of existing predictive data analysis solutions.

BRIEF SUMMARY

In general, various embodiments of the present disclosure provide methods, apparatus, systems, computing devices, computing entities, and/or the like for predicting progressions of machine learning model classifications.

In accordance with one aspect, a method is provided. In one embodiment, the method comprises: generating, by a computing device and using a progression machine learning model, one or more predictive outputs associated with a classification of prediction input data, wherein: the classification is performed using a classification machine learning model based at least in part on a plurality of severity level labels associated with conditions of one or more entities; the one or more predictive outputs comprise a prediction of progression of the classification of the prediction input data comprising assigned ones of the plurality of severity level labels to other ones of the plurality of severity level labels, and the progression machine learning model has been trained on progressions among the plurality of severity level labels based at least in part on one or more model features and one or more outcome labels associated with a base cohort, wherein training the progression machine learning model comprises: receiving a model dataset, the model dataset comprising: i) the one or more model features associated with a plurality of entities, and ii) classifications of the plurality of entities comprising initial severity level labels associated with a first time period and subsequent severity level labels associated with a second time period, wherein the model dataset is generated by: generating the base cohort from feature data associated with a plurality of entities, the base cohort comprising selected ones of the plurality of entities including initial severity level labels associated with the first time period that match a selected set of severity level labels, for each entity in the base cohort, assigning a selected one of the one or more outcome labels to the entity based at least in part on a difference in the initial severity level labels and the subsequent severity level labels, and generating the one or more model features based at least in part on feature data associated with one or more entities from the plurality of entities belonging to the base cohort; and initiating, by the computing device, performance of one or more prediction-based actions based at least in part on the one or more predictive outputs.

In accordance with another aspect, an apparatus comprising at least one processor and at least one memory including computer program code is provided. In one embodiment, the at least one memory and the computer program code may be configured to, with the processor, cause the apparatus to: generate, using a progression machine learning model, one or more predictive outputs associated with the classification of the prediction input data, wherein: the classification is performed using a classification machine learning model based at least in part on a plurality of severity level labels associated with conditions of one or more entities; the one or more predictive outputs comprise a prediction of progression of the classification of the prediction input data comprising assigned ones of the plurality of severity level labels to other ones of the plurality of severity level labels, and the progression machine learning model has been trained on progressions among the plurality of severity level labels based at least in part on one or more model features and one or more outcome labels associated with a base cohort, wherein training the progression machine learning model comprises: receiving a model dataset, the model dataset comprising: i) the one or more model features associated with a plurality of entities, and ii) classifications of the plurality of entities comprising initial severity level labels associated with a first time period and subsequent severity level labels associated with a second time period, wherein the model dataset is generated by: generating the base cohort from feature data associated with a plurality of entities, the base cohort comprising selected ones of the plurality of entities including initial severity level labels associated with the first time period that match a selected set of severity level labels, for each entity in the base cohort, assigning a selected one of the one or more outcome labels to the entity based at least in part on a difference in the initial severity level labels and the subsequent severity level labels, and generating the one or more model features based at least in part on feature data associated with one or more entities from the plurality of entities belonging to the base cohort; and initiate the performance of one or more prediction-based actions based at least in part on the one or more predictive outputs.

In accordance with yet another aspect, a computer program product is provided. The computer program product may comprise at least one computer-readable storage medium having computer-readable program code portions stored therein, the computer-readable program code portions comprising executable portions configured to: generate, using a progression machine learning model, one or more predictive outputs associated with the classification of the prediction input data, wherein: the classification is performed using a classification machine learning model based at least in part on a plurality of severity level labels associated with conditions of one or more entities; the one or more predictive outputs comprise a prediction of progression of the classification of the prediction input data comprising assigned ones of the plurality of severity level labels to other ones of the plurality of severity level labels, and the progression machine learning model has been trained on progressions among the plurality of severity level labels based at least in part on one or more model features and one or more outcome labels associated with a base cohort, wherein training the progression machine learning model comprises: receiving a model dataset, the model dataset comprising: i) the one or more model features associated with a plurality of entities, and ii) classifications of the plurality of entities comprising initial severity level labels associated with a first time period and subsequent severity level labels associated with a second time period, wherein the model dataset is generated by: generating the base cohort from feature data associated with a plurality of entities, the base cohort comprising selected ones of the plurality of entities including initial severity level labels associated with the first time period that match a selected set of severity level labels, for each entity in the base cohort, assigning a selected one of the one or more outcome labels to the entity based at least in part on a difference in the initial severity level labels and the subsequent severity level labels, and generating the one or more model features based at least in part on feature data associated with one or more entities from the plurality of entities belonging to the base cohort; and initiate the performance of one or more prediction-based actions based at least in part on the one or more predictive outputs.

BRIEF DESCRIPTION OF THE DRAWINGS

Figure 1:
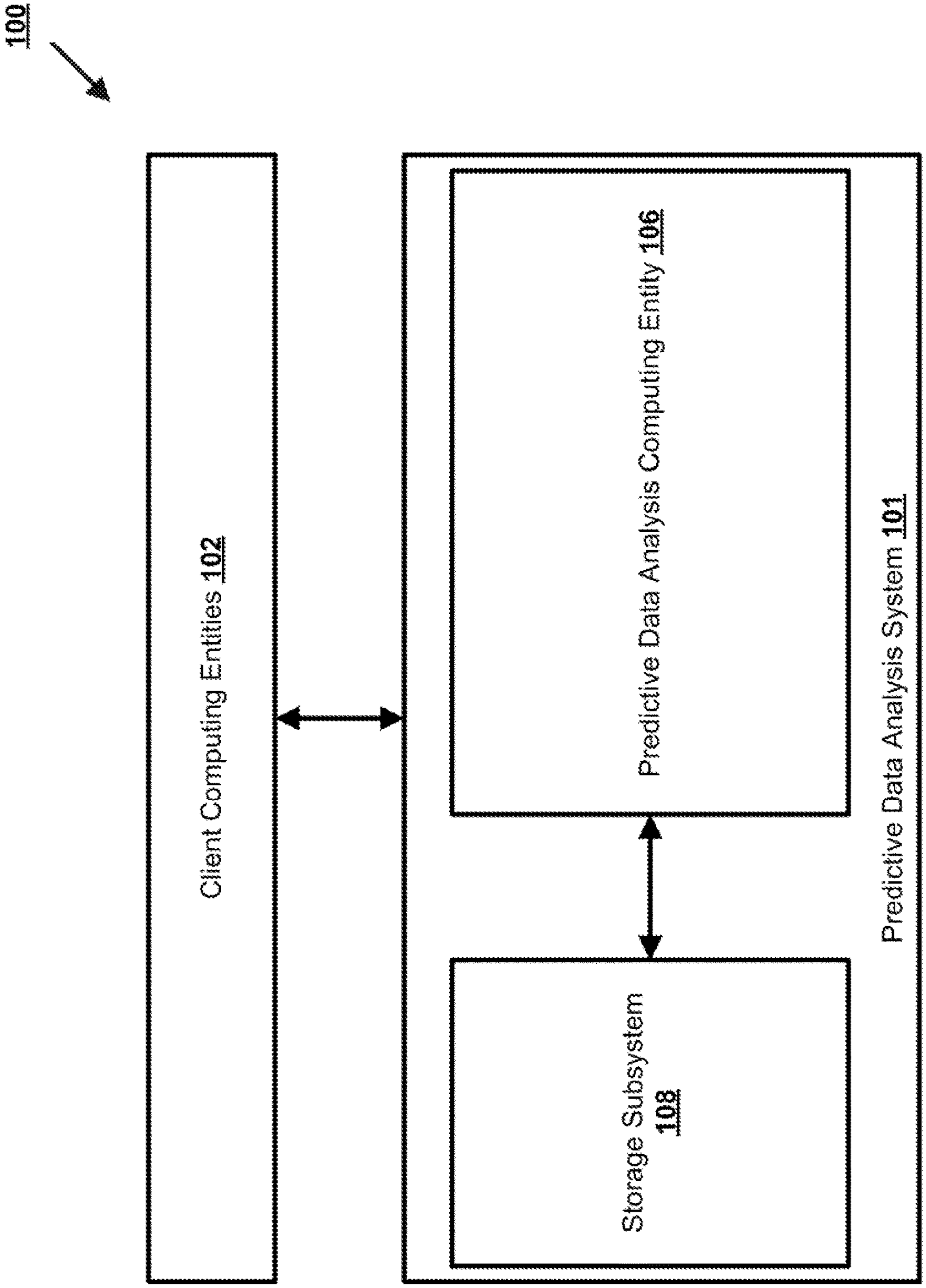

Having thus described the disclosure in general terms, reference will now be made to the accompanying drawings, which are not necessarily drawn to scale, and wherein:

FIG. 1 provides an exemplary overview of an architecture that can be used to practice embodiments of the present disclosure.

Figure 2:
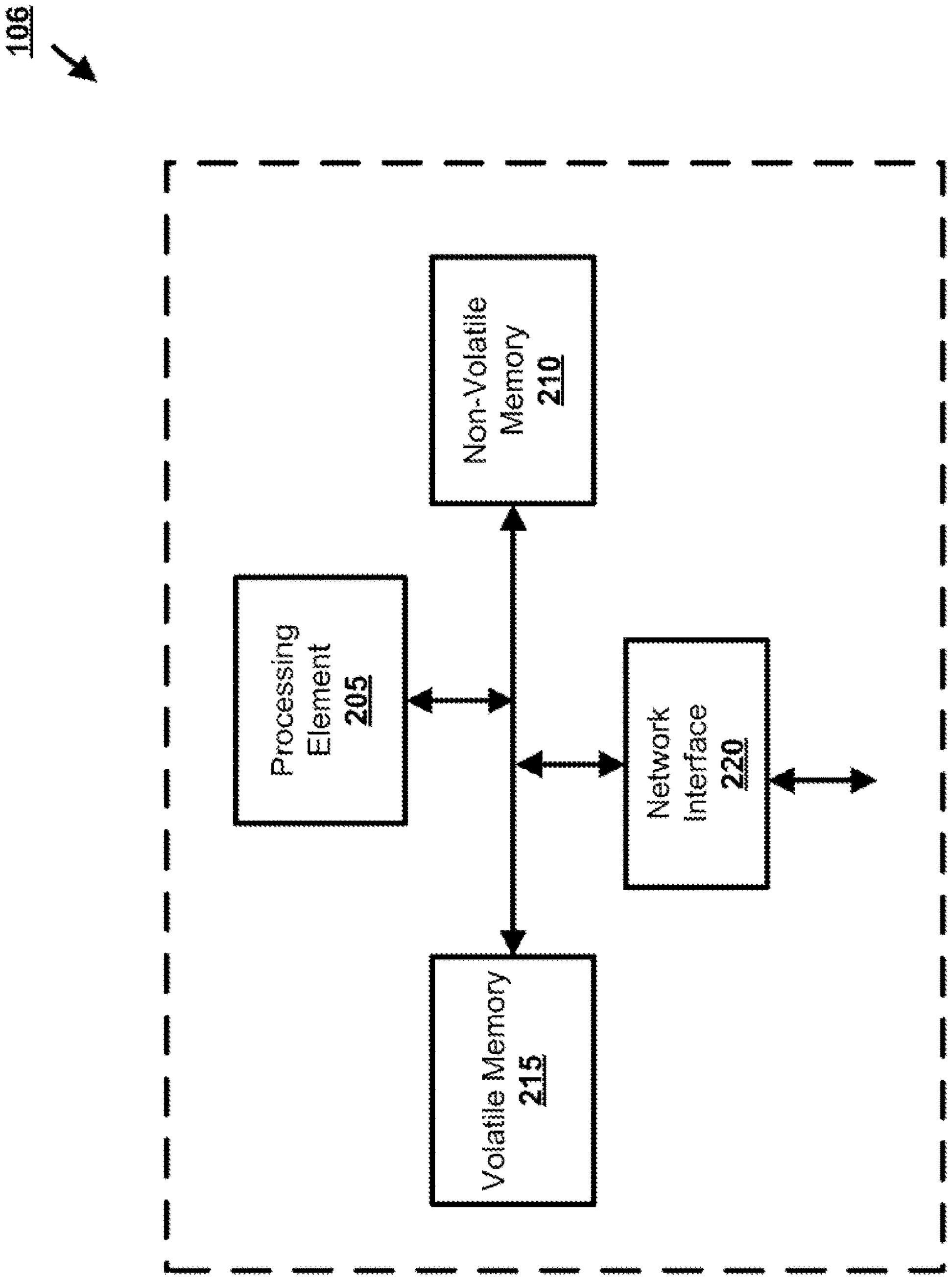

FIG. 2 provides an example predictive data analysis computing entity in accordance with some embodiments discussed herein.

Figure 3:
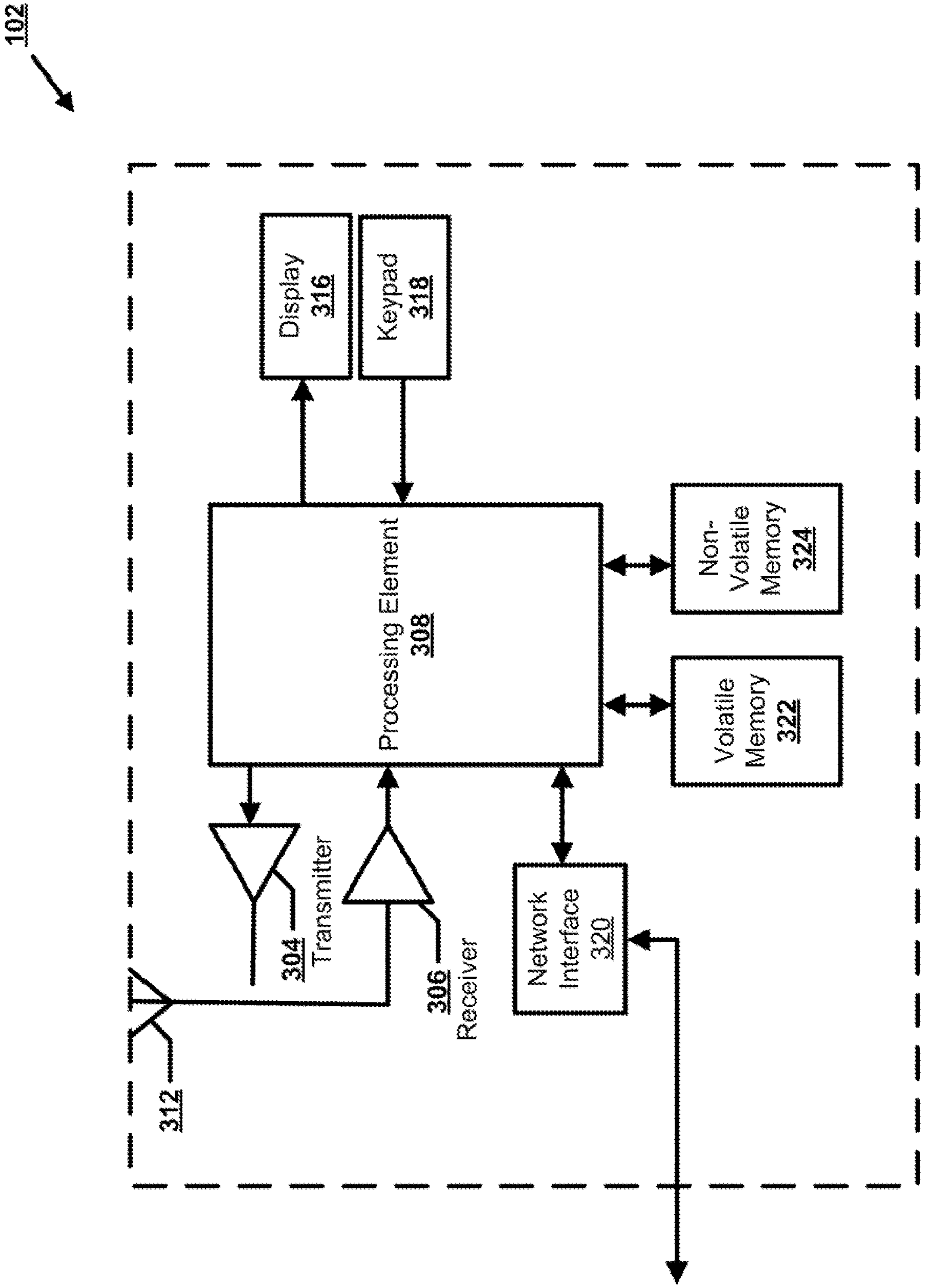

FIG. 3 provides an example client computing entity in accordance with some embodiments discussed herein.

Figure 4:
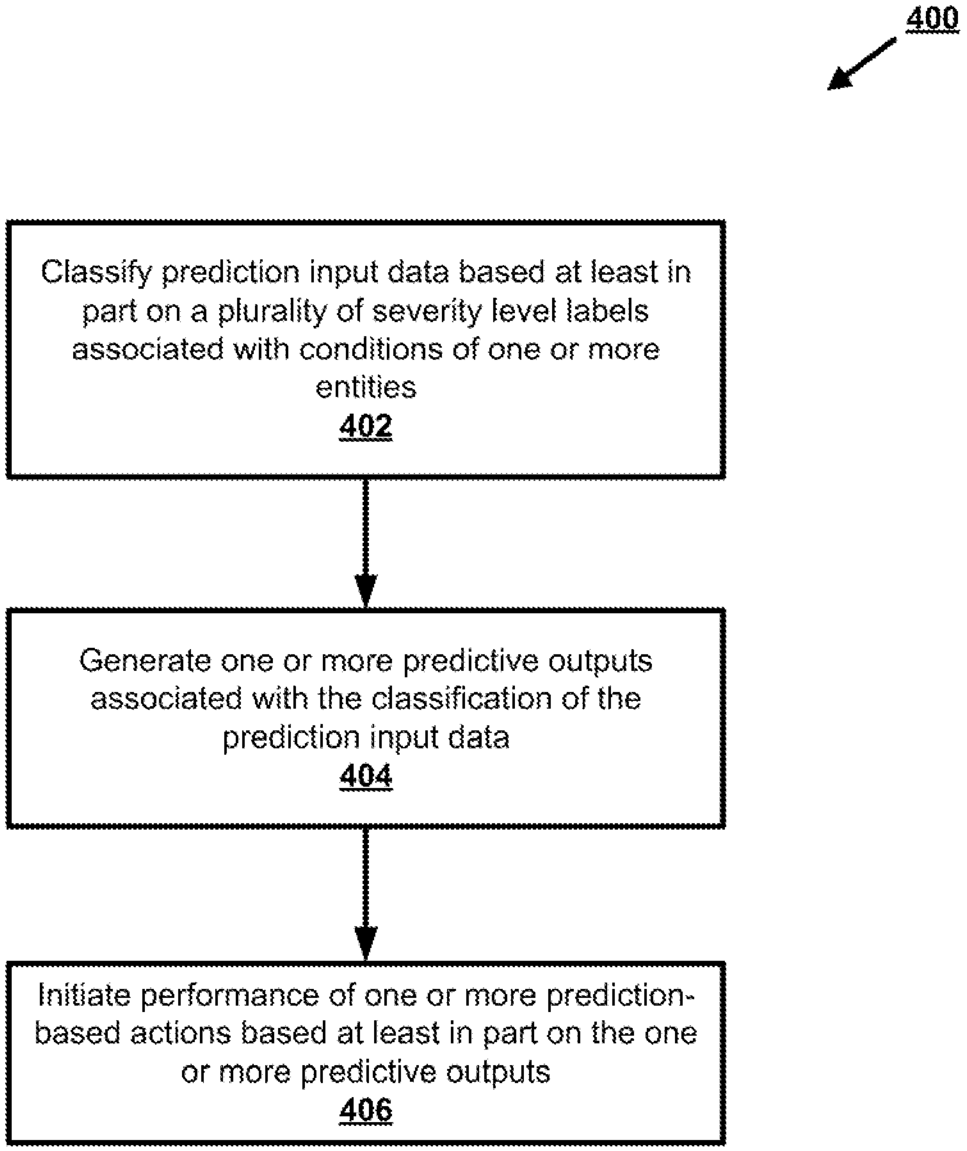

FIG. 4 is a flowchart diagram of an example process for predicting progressions of machine learning model classifications in accordance with some embodiments discussed herein.

Figure 5:
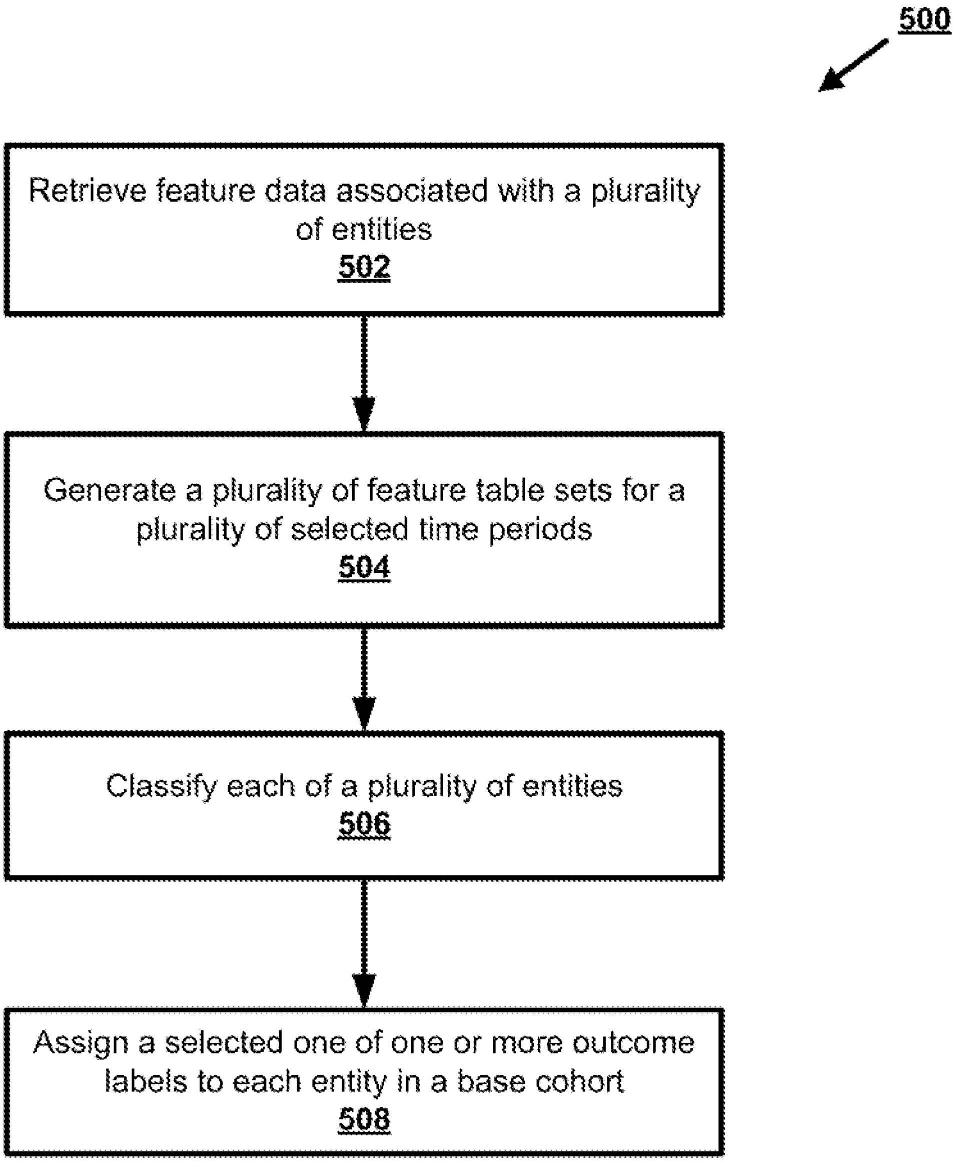

FIG. 5 is a flowchart diagram of an example process for generating a model dataset in accordance with some embodiments discussed herein.

Figure 6:
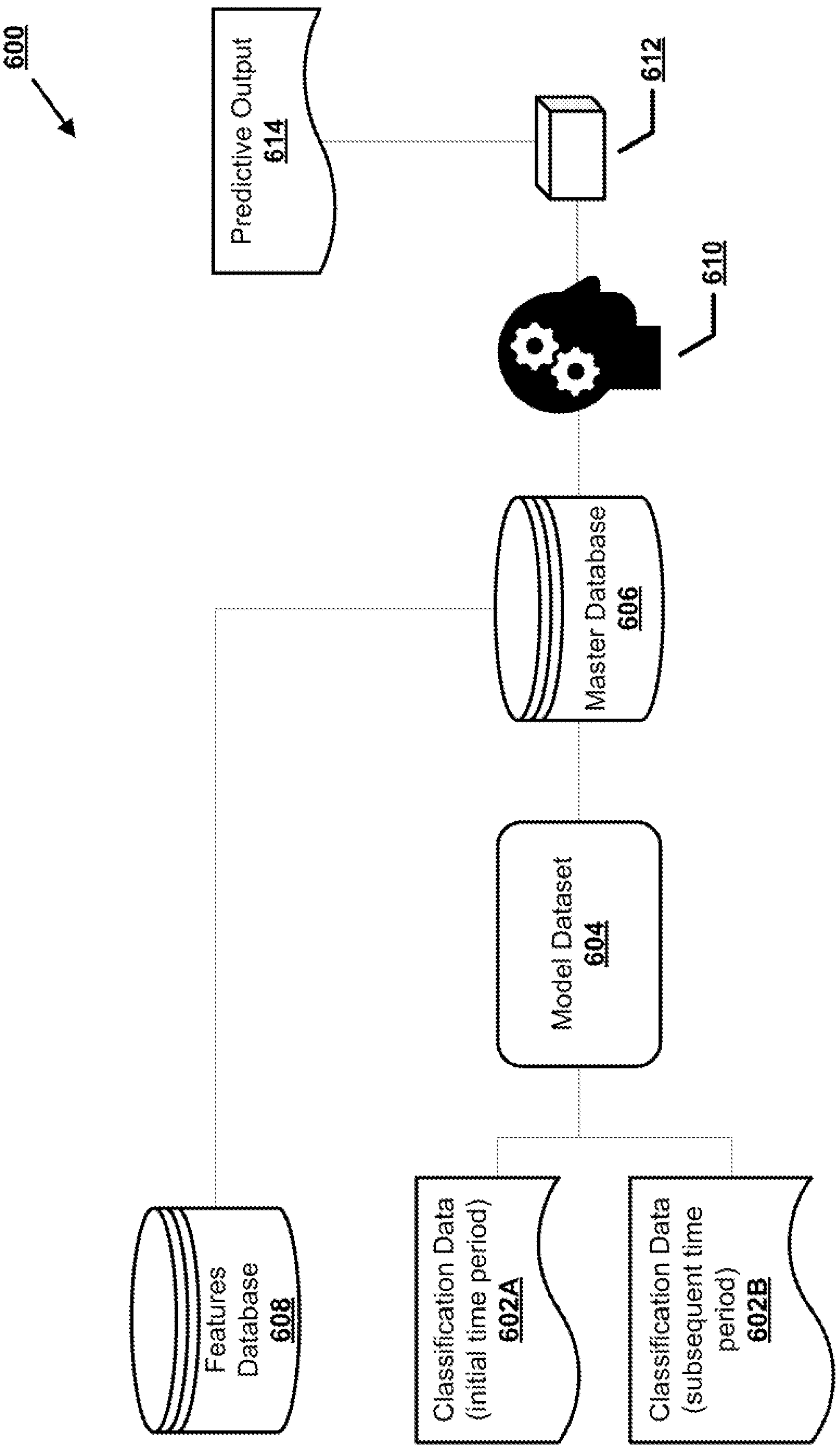

FIG. 6 depicts an exemplary architecture of a system for predicting progressions of machine learning model classifications in accordance with some embodiments discussed herein.

DETAILED DESCRIPTION

Various embodiments of the present disclosure now will be described more fully hereinafter with reference to the accompanying drawings, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to predictive data analysis, one of ordinary skill in the art will recognize that the disclosed concepts can be used to perform other types of data analysis.

I. OVERVIEW AND TECHNICAL IMPROVEMENTS

Various embodiments of the present disclosure make important technical contributions to improving predictive accuracy of predictive machine learning models by predicting progression associated with classification performed on prediction input data, which in turn improves training speed and training efficiency of training predictive machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training machine learning models.

For example, various embodiments of the present disclosure improve predictive accuracy of predictive machine learning models by generating predictive outputs comprising a prediction of severity progression associated with a condition of an entity based at least in part on a classification of prediction input data. As described herein, an optimal course of action for an entity may be influenced not only by the entity's current severity level label, but by a likelihood that the entity will progress to a different severity level label within a given timeframe. Choosing prediction-based actions based at least in part on an entity's likelihood of progressing to a higher severity level label can positively influence the condition of the entity and the condition of an overall system of entities by allocating scarce resources most efficiently among members of the system.

However, in accordance with various embodiments of the present disclosure, a predictive machine learning model may be trained to predict a progression of classification of prediction input data comprising assigned ones of a plurality of severity level labels to other ones of the plurality of severity level labels, where the plurality of severity level labels are associated with conditions of one or more entities. Accordingly, the prediction of the disclosed predictive machine learning model may provide a more accurate assessment of the prediction input data than can be provided by a classification of the prediction input data alone. This technique will lead to higher accuracy of performing predictive operations as needed on certain sets of data. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

II. DEFINITIONS

The term "prediction input data" may refer to a data construct that describes data representative of attributes associated with one or more entities. For example, prediction input data may be associated with criteria for determining classification with respect to a plurality of severity level labels associated with conditions of the one or more entities. In one embodiment, prediction input data may comprise feature data associated with one or more entities for performing classification thereon. According to various embodiments of the present disclosure, prediction input data may be provided to a classification machine learning model for classifying one or more entities based at least in part on the feature data.

The term "severity level label" may refer to a data construct that describes a classification label representative of a tier of severity associated with a condition of an entity. A severity level label may be selected from a plurality of severity level labels and assigned to an entity by a classification machine learning model in performing classification of prediction input data. The severity level label may be representative of a quantitative measure associated with a condition of the entity. For example, high severity level labels may be associated with worse conditions of an entity, and conversely, low severity level labels may be associated with best conditions of an entity.

The term "entity" may refer to a data construct that describes an object, article, file, program, service, task, operation, computing, and/or the like unit that requires one or more resources to execute an operation, perform a task, maintain or advance a state, or continue functioning. For example, an entity may rely on a computing device to perform an action towards the entity. According to various embodiments of the present disclosure, a computing device may perform a prediction-based action towards an entity based at least in part on a prediction on a classification of the entity associated with a severity level label associated with a condition of the entity.

The term "condition" may refer to a data construct that describes features associated with an entity. A condition may be related to functionality, operation, performance, health, or overall well-being of an entity. According to various embodiments of the present disclosure, the condition of an entity may comprise a plurality of aggregated feature data that may be retrieved from a database and used to create a table of feature data.

The term "feature data" may refer to a data construct that describes properties or variables comprised in a dataset. For example, feature data in a model dataset may be used to train a machine learning model. As another example, feature data in prediction input data may be used as input for a machine learning model to generate one or more predictive outputs.

The term "classify" or "classification" may refer to an operation that assigns one or more classification labels, such as severity level labels, to given feature data, e.g., associated with entities, from prediction input data or model datasets. Accordingly, classification of given feature data may comprise assigning severity level labels to feature data of prediction input data or model datasets. In some embodiments, classification may be performed by using a classification machine learning model. The classification machine learning model may be trained with a model dataset (including feature data and severity level labels) to perform classification of prediction input data with severity level labels. In one embodiment, prediction input data may be classified based at least in part on a plurality of severity level labels associated with conditions of one or more entities. The prediction input data may comprise feature data associated with the one or more entities, where for each of the one or more entities, a classification machine learning model may classify the entity with a selected one of the plurality of severity level labels (e.g., multi-class classification). In one embodiment, classification of the prediction input data may comprise classifying entities associated with a prediction cohort. A prediction cohort may comprise given ones of classified entities selected from a prediction cohort table. The classified entities may be classified using a classification machine learning mode based at least in part on their feature data matching criteria of one of a plurality of severity level labels. Entities in the prediction cohort may be selected based at least in part of their classification. For example, the prediction cohort may comprise entities classified with at least a selected one of a plurality of severity level labels.

The term "predictive output" may refer to a data construct that describes output data generated using a machine learning model, such as a progression machine learning model. According to various embodiments of the present disclosure, predictive output generated by a progression machine learning model may be performed on a classification of prediction input data. A classification of prediction input data may comprise an assignment of severity level labels to feature data of prediction input data. Accordingly, a predictive output may comprise a prediction of progression, e.g., change over a time period, of the classification of the prediction input data. The prediction of progression may comprise a predicted escalation from assigned ones of the plurality of severity level labels to other ones of the plurality of severity level labels over a given time period, such as a year, one or more months, or any other time periods as selected. As an example, a predictive output may comprise a current severity level label according to a classification of an entity, a probability of escalating to a higher severity level label for the entity, and a course of action associated with the entity determined based at least in part on the higher severity level label.

The term "model feature" may refer to a data construct that describes a representation, such as embeddings, of feature data used to train a machine learning model, such as a progression machine learning model to generate a trained model. A model feature may be generated based at least in part on feature data associated with a base cohort.

The term "outcome label" may refer to a data construct that describes a classification label associated with criteria based at least in part on analysis or classification of given variables from feature data associated with a model dataset. According to various embodiments of the present disclosure, outcome labels may be used to generate a model dataset. In particular, the model data set is generated by i) generating a base cohort from feature data associated with a plurality of entities, where the base cohort comprises selected ones of a plurality of entities including initial severity level labels associated with a first time period that match a selected set of severity level labels, and ii) for each entity in the base cohort, assigning a selected one of one or more outcome labels to the entity based at least in part on a difference in the initial severity level labels and the subsequent severity level labels.

The term "base cohort" may refer to a data construct that describes a subset of entities used as a basis to train a machine learning model. In one embodiment, a progression machine learning model may be trained on progressions among a plurality of severity level labels based at least in part on one or more model features and one or more outcome labels associated with a base cohort. A base cohort may comprise selected ones of a plurality of entities associated with a plurality of time periods and including initial severity level labels associated with the first time period that match a selected set of severity level labels, and for each entity in the base cohort, a selected one of the one or more outcome labels may be assigned to the entity based at least in part on a difference in the initial severity level labels and the subsequent severity level labels.

The term "prediction cohort" may refer to a data construct that describes given ones of classified entities selected from a prediction cohort table. The classified entities may be classified using a classification machine learning mode based at least in part on their feature data matching criteria of one of a plurality of severity level labels. Entities may be selected to the prediction cohort based at least in part of their classification. For example, the prediction cohort may comprise entities classified with at least a selected one of a plurality of severity level labels.

The term "model dataset" may refer to a data construct that describes a dataset used to train a machine learning model. A model dataset may comprise feature data comprising model input variables and discrete model output variables associated with the model input variables. Feature data in a model dataset may be retrieved or extracted from a database of entity information. For example, a model dataset may comprise feature data associated with a plurality of entities. A model dataset may also comprise classifications of the plurality of entities comprising initial severity level labels associated with a first time period and subsequent severity level labels associated with a second time period. In one embodiment, a model dataset may be partitioned into a training data subset, a validation data subset, and a testing data subset. The training data subset may comprise a portion of the model dataset used during training of a machine learning model to learn features or patterns presented in the training data subset, e.g., to identify parameters that map input variables to discrete output variables. Training the machine learning model may comprise fitting the machine learning model to the training data subset. The validation data subset may comprise input variables and expected model output for evaluating and tuning the machine learning model during training. For example, a machine learning model trained based at least in part on a training data subset may be validated by using the machine learning model to generate prediction output for input variables from a validation data subset and comparing the prediction output generated by the machine learning model to expected model output of the validation data subset. As such, a difference between the prediction output and the expected model output may be used to adjust (e.g., parameters of) the machine learning model. A testing data subset may comprise input variables and expected model output for evaluating the machine learning model after a machine learning model is trained.

The term "classification machine learning model" may refer to a data construct that describes parameters, hyperparameters, and/or defined operations of a machine learning model that is configured to perform classification on given feature data. For example, the classification machine learning model may be used to perform classification on feature data from data, such as prediction input data or model datasets. Accordingly, a classification machine learning model may perform classification by assigning one or more classification labels, such as severity level labels, to feature data of prediction input data or model datasets. In one embodiment, a classification machine learning model may be used to classify prediction input data based at least in part on a plurality of severity level labels associated with conditions of one or more entities. The prediction input data may comprise feature data associated with the one or more entities, where for each of the one or more entities, a classification machine learning model may classify the entity with a selected one of the plurality of severity level labels (e.g., multi-class classification).

The term "progression machine learning model" may refer to a data construct that describes parameters, hyperparameters, and/or defined operations of a machine learning model that is configured to generate one or more predictive outputs associated with a classification of prediction input data. According to various embodiments of the present disclosure, the one or more predictive outputs may comprise a prediction of progression e.g., change over a time period, of the classification of the prediction input data. The prediction of progression may comprise a predicted escalation from assigned ones of the plurality of severity level labels to other ones of the plurality of severity level labels over a given time period, such as a year, one or more months, or any other time periods as selected. A progression machine learning model may be trained on progressions among a plurality of severity level labels based at least in part on one or more model features and one or more outcome labels associated with a base cohort. In one embodiment, training a progression machine learning model may comprise a) receiving a model dataset, the model dataset comprising: i) feature data associated with a plurality of entities, and ii) classifications of the plurality of entities comprising initial severity level labels associated with a first time period and subsequent severity level labels associated with a second time period, and b) generating one or more model features based at least in part on feature data associated with a base cohort.

The term "resource" may refer to a data construct that describes a physical or virtual component of limited availability, such as within or may be provided by a computer system. For example, connected devices and system components may be accessed as resources. Virtual resources may include files, network connections, and memory areas. Additional examples of resources may comprise computation time, a number of steps necessary to solve a problem, and memory space, such as an amount of storage needed while solving the problem. In some embodiments, a resource may also be associated with a stock or supply of money, materials, staff, and other assets that can be drawn on by a computing system.

III. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DEVIM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions.

An example of a prediction-based action that can be performed using the predictive data analysis system 101 is a request for generating a condition diagnosis for one or more entities. For example, in accordance with various embodiments of the present disclosure, a predictive machine learning model may be trained to predict a progression of classification of prediction input data comprising assigned ones of a plurality of severity level labels to other ones of the plurality of severity level labels, where the plurality of severity level labels are associated with conditions of one or more entities. Accordingly, the prediction of the disclosed predictive machine learning model may provide a more accurate assessment of the prediction input data than can be provided by a classification of the prediction input data alone. This technique will lead to higher accuracy of performing predictive operations as needed on certain sets of data. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more network interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more network interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Exemplary Client Computing Entity

FIG. 3 provides an illustrative schematic representative of a client computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present disclosure make important technical contributions to improving predictive accuracy of predictive machine learning models by predicting progression associated with classification performed on prediction input data, which in turn improves training speed and training efficiency of training predictive machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training machine learning models.

FIG. 4 is a flowchart diagram of an example process 400 for predicting progressions of machine learning model classifications. Via the various steps/operations of the process 400, the predictive data analysis computing entity 106 can use a machine learning framework to classify prediction input data and generate predictive outputs associated with the classification of the prediction input data. In accordance with various embodiments of the present disclosure, the predictive data analysis computing entity 106 may be configured to be highly general and applicable in any domain. However, for the purposes of illustration, the present disclosure may refer to various specific implementations including prioritization of computing entities and resource allocation.

The process 400 begins at step/operation 402 when the predictive data analysis computing entity 106 classifies prediction input data based at least in part on a plurality of severity level labels associated with conditions of one or more entities. In some embodiments, prediction input data describes data representative of attributes associated with one or more entities. For example, prediction input data may be associated with criteria for determining classification with respect to the plurality of severity level labels. Prediction input data may comprise data retrieved from a database or server. In one embodiment, prediction input data may comprise feature data associated with one or more entities for performing classification thereon.

In some embodiments, classifying or classification may refer to an operation that assigns one or more classification labels, such as severity level labels, to given feature data, e.g., associated with entities, from the prediction input data. Accordingly, classification of given feature data may comprise assigning severity level labels to feature data of prediction input data. Classification may be performed by using, for example, a classification machine learning model. According to various embodiments of the present disclosure, prediction input data may be provided to a classification machine learning model for classifying the one or more entities using the plurality of severity level labels based at least in part on the feature data.

In some embodiments, a classification machine learning model describes parameters, hyperparameters, and/or defined operations of a machine learning model that is configured to perform classification on given feature data. A classification machine learning model may be trained with a model dataset (including feature data and severity level labels) to perform classification of prediction input data with severity level labels. In one embodiment, the prediction input data may comprise feature data associated with the one or more entities, where for each of the one or more entities, a classification machine learning model may classify the entity with a selected one of the plurality of severity level labels (e.g., multi-class classification).

In some embodiments, a severity level label describes a classification label representative of a tier of severity associated with a condition of an entity. A severity level label may be selected from a plurality of severity level labels and assigned to an entity by a classification machine learning model in performing classification of prediction input data. The severity level label may be representative of a quantitative measure associated with a condition of the entity. For example, high severity level labels may be associated with worse conditions of an entity, and conversely, low severity level labels may be associated with best conditions of an entity.

In some embodiments, a condition describes features associated with an entity. A condition may be related to functionality, operation, performance, health, or overall well-being of an entity. According to various embodiments of the present disclosure, the condition of an entity may comprise a plurality of aggregated feature data that may be retrieved from a database and used to create a table of feature data.

In some embodiments, an entity describes an object, article, file, program, service, task, operation, computing, and/or the like unit that requires one or more resources to execute an operation, perform a task, maintain or advance a state, or continue functioning. For example, an entity may rely on a computing device to perform an action towards the entity.

In one embodiment, classification of the prediction input data may comprise classifying entities associated with a prediction cohort. A prediction cohort may comprise given ones of classified entities selected from a prediction cohort table. The classified entities may be classified using a classification machine learning mode based at least in part on their feature data matching criteria of one of a plurality of severity level labels. Entities may be selected to the prediction cohort based at least in part of their classification. For example, the prediction cohort may comprise entities classified with at least a selected one of a plurality of severity level labels.

According to at least one embodiment, classifying prediction input data may comprise the predictive data analysis computing entity 106 generating a prediction cohort. In some embodiments, a prediction cohort describes a subset of data from prediction input data associated with certain ones of a plurality of entities as a basis for generating predictive output. In one embodiment, generating a prediction cohort from prediction input data may comprise generating feature tables from feature data associated with the plurality of entities, generating a cohort table, generating a feature cohort table, mapping feature data of the feature cohort table to classifying parameters, filtering the feature cohort table according based at least in part on the classifying parameters, and generating a prediction cohort table. A feature table may be generated for each type of feature data present in the prediction input data. The generated feature tables may be organized in, for example, a common data format (CDF).

Examples of feature data may include, but not limited to, run time, status, hardware information, diagnostic values, and activity. Furthermore, as an example of the applicability of the present disclosure to any domain, feature data may represent healthcare information, such as enrollment (e.g., time periods of continuous enrollment in a plan or program), demographic information (e.g., age, gender), clinical codes (e.g., diagnosis codes, procedure codes), lab values (e.g., cholesterol levels), and healthcare utilization (previous hospitalizations, emergency room visits) in an implementation used for predicting progression of heart failure severity. Accordingly, various embodiments of the present disclosure may be applied to any system or industries where prediction of severity level progression may be monitored, such as in financial resources, inventory, human skills, production resources, or information technology and natural resources.

Entities may be filtered for inclusion in the prediction cohort based at least in part on a selected time window (e.g., a model prediction period). In particular, membership of the prediction cohort may be based at least in part on an association of one or more entities with entries in a time-based one of the generated feature tables for the selected time window. In one embodiment, the association may comprise generating a cohort table by joining entity data from a membership table (e.g., comprising the one or more entities) with time-based feature data from the time-based one of the generated feature tables based at least in part on the selected time window, for example, by copying columns or rows of the membership table into the cohort table with corresponding column or row headings. According to one embodiment, an example of the time-based one of the generated feature tables may comprise a feature table generated for run time feature data. In an alternative embodiment, the time-based one of the generated feature tables may comprise a feature generated for enrollment feature data when used in a healthcare implementation.

The prediction cohort may be further filtered based at least in part on segmentation feature data criteria. According to one embodiment, given entries of a cohort table comprising entity data may be removed based at least in part on an association of the given entries to selected segmentation feature data from a segmentation-based one of the generated feature tables. As an example, entity data may be removed from a cohort table based at least in part on hardware information feature data from a hardware information feature table that matches selected hardware information feature data criteria. As another example, entity data may be removed from a cohort table based at least in part on demographic information feature data from a demographic information feature table that matches selected demographic information feature data criteria.

The cohort table may be joined to a given one of the generated feature tables to create a feature cohort table. The given feature table may be filtered prior to joining with the feature cohort table. Feature data from a filtered feature table may be joined to corresponding entries in the cohort table (e.g., based at least in part on entity data). For example, a status feature table may be filtered by certain statuses and joined to a cohort table to create a status cohort table. According to another example, a clinical codes feature table may be filtered by certain clinical codes and joined to a cohort table to create a clinical codes cohort table for a healthcare implementation.

Entries in the feature cohort table may be mapped to classifying parameters based at least in part on mapping specifications that may be included in the prediction input data. As an example, the mapping specifications may comprise criteria for mapping status feature data to detail data. According to another example, as used in a healthcare implementation, the mapping specification may comprise a mapping of clinical codes to episode treatment group (ETG) codes, where the ETG codes may be associated with a patient classification system for measuring outcomes performance by episode of illness.

The feature cohort table may be filtered based at least in part on the classifying parameters. Filtering the feature cohort table may comprise selecting one or more entries in the feature cohort table that is mapped to a selected classifying parameter. For example, in one embodiment, the selected classifying parameter may comprise detail data of at least a least severe one of a plurality of detail data. As another example, the selected classifying parameter may comprise an ETG code of at least a least severe one of a plurality of ETG codes.

The filtered feature cohort table may be joined with one or more remaining types of the generated feature tables to generate a prediction cohort table. Referring to a previous example, remaining types of generated feature tables may comprise a diagnostic value feature table and an activity feature table. Referring to another previous example, remaining ones of generated feature tables may comprise a lab values feature table and a healthcare utilization feature table. The prediction cohort table may comprise a plurality of aggregated feature data representative of conditions of entities associated with the aggregated feature data.

According to various embodiments of the present disclosure, the plurality of entities from the prediction cohort table may be classified by the predictive data analysis computing entity 106 based at least in part on a plurality of severity level labels. For example, a classification machine learning model may use feature data from the prediction cohort table to determine selected ones of the plurality of severity level labels to assign each of the plurality of entities. The classification machine learning model may be trained based at least in part on matching of the plurality of aggregated feature data from the prediction cohort table to criteria for each of the plurality of severity level labels.

In one embodiment, a plurality of severity level labels may correspond to service outage severity. For example, "Severity Level 1" may comprise a severity level label representative of a status of negligible severity including diagnostic values representative of little or no obvious impact on services. "Severity Level 2" may comprise a severity level label representative of a status of minimal severity including diagnostic values representative of minimal service disruption and effect on users/customers. "Severity Level 3" may comprise a severity level label representative of a status of significant severity including diagnostic values and activities representative of user/customer service disruptions, mostly of limited scope, duration or effect. "Severity Level 4" may comprise a severity level label representative of a status of serious severity including diagnostic values and activities representative of disruption of service and/or operation. "Severity Level 5" may comprise a severity level label representative of a status of severe severity including diagnostic values and activities representative of major and damaging disruption of services and/or operations.

According to another embodiment, a plurality of severity level labels may correspond to heart failure severity. For example, "Severity Level 1" may comprise a severity level label representative of any clinical code associated with heart failure (e.g., International Classification of Disease, 10th Revision), without evidence of progression, such as heart failure with reduced ejection fraction (HFrEF), heart failure with preserved ejection fraction (HFpEF) or cardiomyopathy—pathology of cardiac muscle. "Severity Level 2" may comprise a severity level label representative of clinical codes associated with loop diuretic use or chronic kidney disease (CKD) 3, or lab values comprising natriuretic peptide (BNP)>100, NT-proBNP>400 (LOINC=33762.6), or creatinine>1.5. "Severity Level 3" may comprise a severity level label representative of clinical codes or lab values associated with heart failure code in primary position for one hospital, observation or emergency department event, or any antidysrhythmic, or biventricular pacemaker, or furosemide dose>60 mg./day, or Area Deprivation Index (ADI) for past 6 months>90, or atrial fibrillation diagnosis, or chronic obstructive pulmonary disease (COPD) or hypertensive heart disease, or hypertrophic cardiomyopathy. "Severity Level 4" may comprise a severity level label representative of clinical codes or lab values associated with heart failure code in primary position for >1 hospital, observation, or emergency department event or sodium (Na+)<131, or heart rate>100, or CKD 4 or CKD 5, or use of metolazone, torsemide, or bumetanide. "Severity Level 5" may comprise a severity level label representative of clinical codes associated with home inotrope use with dobutamine, milrinone, or dopamine, or respiratory arrest.

At step/operation 404, the predictive data analysis computing entity 106 generates, using a progression machine learning model, one or more predictive outputs associated with the classification of the prediction input data. In some embodiments, a predictive output describes output data generated using a machine learning model, such as a progression machine learning model. According to various embodiments of the present disclosure, predictive output generated by a progression machine learning model may comprise a prediction of progression e.g., change over a time period, of the classification of the prediction input data. The prediction of progression may comprise a predicted escalation from assigned ones of the plurality of severity level labels to other ones of the plurality of severity level labels over a given time period, such as a year, one or more months, or any other time periods as selected. As an example, a predictive output may comprise a current severity level label according to a classification of an entity, a probability of escalating to a higher severity level label for the entity, and a course of action associated with the entity determined based at least in part on the higher severity level label In some embodiments, a progression machine learning model describes parameters, hyperparameters, and/or defined operations of a machine learning model that is configured to generate one or more predictive outputs associated with a classification of prediction input data. As discussed above, the one or more predictive outputs may comprise prediction of progression e.g., change over a time period, of classification of prediction input data. In one embodiment, the progression machine learning model may comprise a distributed gradient boosting machine learning model, such as a XGBoost model using Bayesian search for hyperparameter tunning.

A progression machine learning model may be trained on progressions among a plurality of severity level labels based at least in part on one or more model features and one or more outcome labels associated with a base cohort. In one embodiment, training a progression machine learning model may comprise a) receiving a model dataset, the model dataset comprising: i) feature data associated with a plurality of entities, and ii) classifications of the plurality of entities comprising initial severity level labels associated with a first time period and subsequent severity level labels associated with a second time period, and b) generating one or more model features based at least in part on feature data associated with a base cohort. Training the progression machine learning model is described in further detail with respect to the description of FIG. 5.

As described herein, in accordance with various embodiments of the present disclosure, a predictive machine learning model may be trained to predict a progression of classification of prediction input data comprising assigned ones of a plurality of severity level labels to other ones of the plurality of severity level labels, where the plurality of severity level labels are associated with conditions of one or more entities. Accordingly, the prediction of the disclosed predictive machine learning model may provide a more accurate assessment of the prediction input data than can be provided by a classification of the prediction input data alone. This technique will lead to higher accuracy of performing predictive operations as needed on certain sets of data. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

At step/operation 406, the predictive data analysis computing entity 106 initiates the performance of one or more prediction-based actions based at least in part on the one or more predictive outputs. According to various embodiments of the present disclosure, a computing device may perform a prediction-based action towards an entity based at least in part on a prediction on a classification of the entity associated with a severity level label associated with a condition of the entity. In some embodiments, initiating the performance of the one or more prediction-based actions based at least in part on the one or more predictive outputs includes allocating resources to entities associated with the one or more predictive outputs. For example, resources may be allocated to entities identified as benefiting the most from the resources based at least in part on a prediction of progression of classification of prediction input data comprising assigned ones of a plurality of severity level labels to other ones of a plurality of severity level labels.

According to other embodiments, initiating the performance of the one or more prediction-based actions based at least in part on the one or more predictive outputs may include determining whether resources (e.g., in terms of either quantity, frequency, or type) should be allocated for specific entities. In certain cases, a best practice for resource allocation may be known according to specifications or industry standards. However, in certain instances, it may be unclear what resources should be allocated to certain entities in light of possible progressions in their classifications. By utilizing predictive outputs according to embodiments of the present disclosure, resources may be matched to anticipated resource requirements to optimize benefit of scare resources and improve responsiveness to entity needs.

In some embodiments, a resource describes a physical or virtual component of limited availability, such as within or may be provided by a computer system. For example, connected devices and system components may be accessed as resources. Virtual resources may include files, network connections, and memory areas. Additional examples of resources may comprise computation time, a number of steps necessary to solve a problem, and memory space, such as an amount of storage needed while solving the problem. In some embodiments, a resource may also be associated with a stock or supply of money, materials, staff, and other assets that can be drawn on by a computing system.

In some embodiments, initiating the performance of the one or more prediction-based actions may further include displaying entity evaluation data (e.g., representative or including classification with severity level labels) and configurations or recommendations for courses of action that may be taken based at least in part on one or more predictive outputs via a prediction output user interface, such as a prediction output user interface. According to one exemplary embodiment, courses of action may comprise allocating resources, stopping/starting services, overriding tasks, remote access control, and notifying one or more users. In another exemplary embodiment, courses of action may comprise automated communications and reminders (for maintenance, periodic care, and preventive testing), outbound and inbound communications or electronic support (e.g., support personnel, care/case managers or other professionals who can field questions and direct to appropriate care), daily measurements, automated uploading to a central server with exception reporting, and task reporting.

As disclosed herewith, a progression machine learning model may be used to generate predictive outputs for classifications of prediction input data. Each predictive output may describe a predicted change from a current classification to another classification over a given time period, e.g., a predicted escalation from assigned ones of the plurality of severity level labels to other ones of the plurality of severity level labels over a given time period, such as a year, one or more months, or any other time periods as selected.

Training the progression machine learning model may comprise the predictive data analysis computing entity 106 receiving a model dataset and generating one or more model features based at least in part on feature data associated with one or more entities from the plurality of entities belonging to a base cohort. In one embodiment, the progression machine learning model may be trained on progressions among the plurality of severity level labels based at least in part on one or more model features and one or more outcome labels associated with the base cohort.

In some embodiments, a model dataset describes a dataset used to train a machine learning model. A model dataset may comprise feature data comprising model input variables and discrete model output variables associated with the model input variables. Feature data in a model dataset may be retrieved or extracted from a database of entity information. For example, a model dataset may comprise feature data associated with a plurality of entities. A model dataset may also comprise classifications of the plurality of entities comprising initial severity level labels associated with a first time period and subsequent severity level labels associated with a second time period. In one embodiment, a model dataset may be partitioned into a training data subset, a validation data subset, and a testing data subset. The training data subset may comprise a portion of the model dataset used during training of a machine learning model to learn features or patterns presented in the training data subset, e.g., to identify parameters that map input variables to discrete output variables.

Training the machine learning model may comprise fitting the machine learning model to the training data subset. The validation data subset may comprise input variables and expected model output for evaluating and tuning the machine learning model during training. For example, a machine learning model trained based at least in part on a training data subset may be validated by using the machine learning model to generate prediction output for input variables from a validation data subset and comparing the prediction output generated by the machine learning model to expected model output of the validation data subset. As such, a difference between the prediction output and the expected model output may be used to adjust (e.g., parameters of) the machine learning model. A testing data subset may comprise input variables and expected model output for evaluating the machine learning model after a machine learning model is trained.

FIG. 5 is a flowchart diagram of an example process 500 for generating a model dataset used to train, validate, and test a progression machine learning model. Via the various steps/operations of the process 500, the predictive data analysis computing entity 106 can generate a base cohort from feature data associated with selected ones of plurality of entities, assign outcome labels to each entity in the base cohort, and generate model features for entities belonging to the base cohort.

The process 500 begins at step/operation 502 when the predictive data analysis computing entity 106 retrieves feature data associated with a plurality of entities. The feature data may be retrieved from a collection of aggregated data from, for example, a database or similar data source. In one embodiment, the feature data may comprise data associated with conditions of a plurality of entities. For example, a condition may be related to functionality, operation, performance, health, or overall well-being of an entity. Examples of feature data may include, but not limited to, run time, status, hardware information, diagnostic values, and activity. Furthermore, as an example of the applicability of the present disclosure to any domain, feature data may represent healthcare information, such as enrollment (e.g., time periods of continuous enrollment in a plan or program), demographic information (e.g., age, gender), clinical codes (e.g., diagnosis codes, procedure codes), lab values (e.g., cholesterol levels), and healthcare utilization (previous hospitalizations, emergency room visits) in an implementation used for predicting progression of heart failure severity.

At step/operation 504, the predictive data analysis computing entity 106 generates a plurality of feature table sets for a plurality of selected time periods. A feature table set may comprise a plurality of feature tables, where each feature table may be generated for each type of feature data for a selected time period.

At step/operation 506, the predictive data analysis computing entity 106 classifies each of a plurality of entities for each of the plurality of feature table sets. That is, the plurality of entities may be classified for each of the selected time periods associated with the plurality of feature table sets. For example, the plurality of entities may be classified with initial severity level labels for a first time period (associated with a first feature table set) and one or more subsequent severity level labels for one or more subsequent time periods, e.g., second, third, (associated with second, third feature table sets, respectively).

According to various embodiments of the present disclosure, a plurality of entities from the plurality of feature table sets may be classified by the predictive data analysis computing entity 106 based at least in part on a plurality of severity level labels. For example, a classification machine learning model may use feature data from the plurality of feature table sets to determine selected ones of the plurality of severity level labels to assign each of the plurality of entities. The classification machine learning model may be trained based at least in part on matching of feature data from the feature table sets to criteria for each of the plurality of severity level labels. Criteria for each of the plurality of severity level labels may be substantially similar to those described above with respect to generating a prediction cohort.

At step/operation 508, the predictive data analysis computing entity 106 assigns a selected one of one or more outcome labels to each entity in a base cohort based at least in part on a difference in initial severity level labels and subsequent severity level labels. In some embodiments, an outcome label describes a classification label associated with criteria based at least in part on analysis or classification of given variables from feature data associated with a model dataset. For example, a positive outcome label (representative of an escalation) may be assigned an entity classified with a subsequent severity level label for a subsequent time period that is higher an initial severity level label associated with a classification of the entity for an initial time period. Conversely, a negative outcome label may be assigned to the entity if the subsequent severity level label is lower than the initial severity level label.

In one embodiment, a progression machine learning model may be trained on progressions among a plurality of severity level labels based at least in part on one or more model features and one or more outcome labels associated with the base cohort. The base cohort may comprise selected ones of a plurality of entities including feature data associated with a plurality of time periods and initial severity level labels associated with a first time period that match a selected set of severity level labels. In some embodiments, a base cohort describes a subset of entities used as a basis to train a machine learning model. Generating the base cohort may comprise, for each of the plurality of feature table sets, generating a cohort table, generating a feature cohort table, mapping feature data of the feature cohort table to classifying parameters, filtering the feature cohort table according based at least in part on the classifying parameters, and generating a model cohort table.

Entities may be filtered for inclusion in the base cohort based at least in part on a selected time window (e.g., a model prediction period). In particular, membership of the base cohort may be based at least in part on an association of one or more entities with entries in a time-based one of the generated feature tables for the selected time window. In one embodiment, the association may comprise generating a plurality of cohort tables by joining entity data from a membership table (e.g., comprising the one or more entities) with time-based feature data from the time-based one of the generated feature tables based at least in part on selected time windows, for example, by copying columns or rows of the membership table into the plurality of cohort tables with corresponding column or row headings. According to one embodiment, an example of the time-based one of the generated feature tables may comprise a feature table generated for run time feature data. In an alternative embodiment, the time-based one of the generated feature tables may comprise a feature generated for enrollment feature data when used in a healthcare implementation.

The base cohort may be further filtered based at least in part on segmentation feature data criteria. According to one embodiment, given entries of a cohort table comprising entity data may be removed based at least in part on an association of the given entries to selected segmentation feature data from a segmentation-based one of the generated feature tables. As an example, entity data may be removed from a cohort table based at least in part on hardware information feature data from a hardware information feature table that matches selected hardware information feature data criteria. As another example, entity data may be removed from a cohort table based at least in part on demographic information feature data from a demographic information feature table that matches selected demographic information feature data criteria.

A cohort table may be joined to a given one of the generated feature tables to create a feature cohort table. The given feature table may be filtered prior to joining with the feature cohort table. Feature data from a filtered feature table may be joined to corresponding entries in the cohort table (e.g., based at least in part on entity data). For example, a status feature table may be filtered by certain statuses and joined to a cohort table to create a status cohort table. According to another example, a clinical codes feature table may be filtered by certain clinical codes and joined to a cohort table to create a clinical codes cohort table for a healthcare implementation.

Entries in the feature cohort table may be mapped to classifying parameters based at least in part on mapping specifications that may be included in the collection of aggregated data from which feature data was retrieved from. As an example, the mapping specifications may comprise criteria for mapping status feature data to detail data. According to another example, as used in a healthcare implementation, the mapping specification may comprise a mapping of clinical codes to episode treatment group (ETG) codes, where the ETG codes may be associated with a patient classification system for measuring outcomes performance by episode of illness.

The feature cohort table may be filtered based at least in part on the classifying parameters. Filtering the feature cohort table may comprise selecting one or more entries in the feature cohort table that is mapped to a selected classifying parameter. For example, in one embodiment, the selected classifying parameter may comprise detail data of at least a least severe one of a plurality of detail data. As another example, the selected classifying parameter may comprise an ETG code of at least a least severe one of a plurality of ETG codes.

The filtered feature cohort table may be joined with one or more remaining types of the generated feature tables to generate a model cohort table. Referring to a previous example, remaining types of generated feature tables may comprise a diagnostic value feature table and an activity feature table. In another previous example, remaining types of generated feature tables may comprise a lab values feature table and a healthcare utilization feature table. The model cohort table may comprise a plurality of aggregated feature data representative of conditions of entities associated with the aggregated feature data.

In some embodiments, an exemplary system for predicting progressions of machine learning model classifications has an architecture that is depicted in FIG. 6. As further depicted in FIG. 6, a classification progression prediction system 600 comprises master database 606, features database 608, progression machine learning model system 610. Master database 606 may comprise one or more model datasets that can be used for training progression machine learning model system 610. A model dataset 604 comprises classification data 602A and classification data 602B. Classification data 602A and classification data 602B may comprise data, such as feature data (from, e.g., feature tables), severity level labels, and outcome labels associated with classified entities, e.g., from a base cohort. Classification data 602A may comprise data associated with classification of entities associated with a feature table set for an initial time period. Classification data 602A may comprise data associated with classification of entities associated with a feature table set for subsequent time period.

Master database 606 may be configured to associate data from features database 608 with model dataset 604. Features database 608 may comprise a database of ancillary data that may be associated with model dataset 604. For example, features database 608 may provide data that can be used to supplement model dataset 604 for generating model features of trained model 612. Model features may be generated by progression machine learning model system 610 via training with data from master database 606. In some embodiments, a model feature describes a representation, such as embeddings, of feature data used to train a machine learning model, such as trained model 612. A model feature may be generated based at least in part on feature data associated with a base cohort. According to one embodiment, trained model 612 may comprise a distributed gradient boosting machine learning model, such as XGBoost model using Bayesian search for hyperparameter tunning. Trained model 612 may be used to generate predictive output 614 comprising predictions of outcomes associated with classification transitions among a plurality of severity level labels of entities for a future time period.

Accordingly, as described above, various embodiments of the present disclosure make important technical contributions to improving predictive accuracy of predictive machine learning models by predicting progression associated with classification performed on prediction input data, which in turn improves training speed and training efficiency of training predictive machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training machine learning models.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

inputting, by one or more processors, input data to a machine learning framework to generate a predictive output indicating a likelihood of a first severity level classification label of a plurality of severity level classification labels progressing to a second severity level classification label, different from the first severity level classification label, wherein (i) the machine learning framework comprises a classification machine learning model and a progression machine learning model, (ii) the classification machine learning model is configured to assign one of the plurality of severity level classification labels to the input data, and (iii) generating the predictive output comprises:

inputting the input data to the classification a machine learning model to generate a classification comprising the first severity level classification label of the plurality of severity level classification labels;

inputting the classification to the progression machine learning model to generate the predictive output, wherein generating the classification prior to generating the predictive output reduces a number of operations required to be performed by the progression machine learning model and training the progression machine learning model comprises:

receiving a model dataset comprising (a) a plurality of model features associated with a plurality of entities, and (b) a plurality of classifications of the plurality of entities, the plurality of classifications comprising an initial severity level classification label associated with a first time period, and a subsequent severity level classification label associated with a second time period, wherein the model dataset is generated by:

(1) generating a base cohort from feature data associated with the plurality of entities, the base cohort comprising selected ones of the plurality of entities including initial severity level classification labels associated with the first time period that match a selected set of severity level classification labels, (2) assigning a selected one of a plurality of outcome labels to the selected ones of the plurality of entities based at least in part on a difference in the initial severity level classification label and the subsequent severity level classification label, and (3) generating the plurality of model features based at least in part on feature data associated with the selected ones of the plurality of entities, wherein the progression machine learning model is trained based on the model dataset; and initiating, by the one or more processors, performance of a prediction-based action based at least in part on the predictive output.

2. The computer-implemented method of claim 1, wherein the progression machine learning model comprises a distributed gradient boosting machine learning model.

3. The computer-implemented method of claim 1, wherein training the progression machine learning model further comprises:

generating a training data subset, a validation data subset, and a testing data subset from the model dataset.

4. The computer-implemented method of claim 1, wherein the classification is based at least in part on a plurality of criteria corresponding to the plurality of severity level classification labels.

5. The computer-implemented method of claim 1, wherein the input data comprises feature data associated with the plurality of entities over a third time period.

6. The computer-implemented method of claim 1, further comprising:

determining, by the one or more processors, whether a computational resource should be allocated to a computing system based on the predictive output; and initiating, by the one or more processors, allocation of the computational resource to the computing system based on the determination.

7. The computer-implemented method of claim 1, wherein the second severity level classification label is a higher severity level than the first severity level classification label.

8. A system comprising:
one or more processors; and
one or more memories storing processor-executable instructions that, when executed by the one or more processors, cause the one or more processors to perform operations comprising:
inputting input data to a machine learning framework to generate a predictive output indicating a likelihood of a first severity level classification label of a plurality of severity level classification labels progressing to a second severity level classification label, different from the first severity level classification label, wherein (i) the machine learning framework comprises a classification machine learning model and a progression machine learning model, (ii) the classification machine learning model is configured to assign one of the plurality of severity level classification labels to the input data, and (iii) generating the predictive output comprises:
inputting the input data to the classification machine learning model to generate a classification comprising the first severity level classification label of the plurality of severity level classification labels;
inputting the classification to the progression machine learning model to generate the predictive output, wherein generating the classification prior to generating the predictive output reduces a number of operations required to be performed by the progression machine learning model and training the progression machine learning model comprises:
receiving a model dataset comprising (a) a plurality of model features associated with a plurality of entities, and (b) a plurality of classifications of the plurality of entities, the plurality of classifications comprising an initial severity level classification label associated with a first time period, and a subsequent severity level classification label associated with a second time period, wherein the model dataset is generated by:
(1) generating a base cohort from feature data associated with the plurality of entities, the base cohort comprising selected ones of the plurality of entities including initial severity level classification labels associated with the first time period that match a selected set of severity level classification labels,
(2) assigning a selected one of a plurality of outcome labels to the selected ones of the plurality of entities based at least in part on a difference in the initial severity level classification label and the subsequent severity level classification label, and
(3) generating the plurality of model features based at least in part on feature data associated with the selected ones of the plurality of entities, wherein the progression machine learning model is trained based on the model dataset; and
initiating performance of a prediction-based action based at least in part on the predictive output.

9. The system of claim 8, wherein the progression machine learning model comprises a distributed gradient boosting machine learning model.

10. The system of claim 8, wherein training the progression machine learning model further comprises:
generating a training data subset, a validation data subset, and a testing data subset from the model dataset.

11. The system of claim 8, wherein the classification is based at least in part on a plurality of criteria corresponding to the plurality of severity level classification labels.

12. The system of claim 8, wherein the input data comprises feature data associated with the plurality of entities over a third time period.

13. The system of claim 8, wherein the one or more processors are further caused to:
determine whether a computational resource should be allocated to a computing system based on the predictive output; and
initiate allocation of the computational resource to the computing system based on the determination.

14. The system of claim 8, wherein the second severity level classification label is a higher severity level than the first severity level classification label.

15. One or more non-transitory computer-readable media storing processor-executable instructions that, when executed by one or more processors, cause the one or more processors to perform operations comprising:
inputting input data to a machine learning framework to generate a predictive output indicating a likelihood of a first severity level classification label of a plurality of severity level classification labels progressing to a second severity level classification label, different from the first severity level classification label, wherein (i) the machine learning framework comprises a classification machine learning model and a progression machine learning model, (ii) the classification machine learning model is configured to assign one of the plurality of severity level classification labels to the input data, and (iii) generating the predictive output comprises:
inputting the input data to the classification machine learning model to generate a classification comprising the first severity level classification label of the plurality of severity level classification labels;
inputting the classification to the progression machine learning model to generate the predictive output, wherein generating the classification prior to generating the predictive output reduces a number of operations required to be performed by the progression machine learning model and training the progression machine learning model comprises:
receiving a model dataset comprising (a) a plurality of model features associated with a plurality of entities, and (b) a plurality of classifications of the plurality of entities, the plurality of classifications comprising an initial severity level classification label associated with a first time period, and a subsequent severity level classification label associated with a second time period, wherein the model dataset is generated by:
(1) generating a base cohort from feature data associated with the plurality of entities, the base cohort comprising selected ones of the plurality of entities including initial severity level classification labels associated with the first time period that match a selected set of severity level classification labels, (2) assigning a selected one of a plurality of outcome labels to the selected ones of the plurality of entities based at least in part on a difference in the initial severity level classification label and the subsequent severity level classification label, and (3) generating the plurality of model features based at least in part on feature data associated with the selected ones of the plurality of entities, wherein the progression machine learning model is trained based on the model dataset; and initiating performance of a prediction-based action based at least in part on the predictive output.

16. The one or more non-transitory computer-readable media of claim 15, wherein the progression machine learning model comprises a distributed gradient boosting machine learning model.

17. The one or more non-transitory computer-readable media of claim 15, wherein training the progression machine learning model further comprises:

generating a training data subset, a validation data subset, and a testing data subset from the model dataset.

18. The one or more non-transitory computer-readable media of claim 15, wherein the classification is based at least in part on a plurality of criteria corresponding to the plurality of severity level classification labels.

19. The one or more non-transitory computer-readable media of claim 15, wherein the one or more processors are further caused to:

determine whether a computational resource should be allocated to a computing system based on the predictive output; and initiate allocation of the computational resource to the computing system based on the determination.

20. The one or more non-transitory computer-readable media of claim 15, wherein the second severity level classification label is a higher severity level than the first severity level classification label.

* * * * *